F. A. FOWLER & G. W. PRATHER.
SUPPLEMENTAL SEAT FOR MOTOR CYCLES.
APPLICATION FILED MAY 31, 1911.
1,013,007.
Patented Dec. 26, 1911.
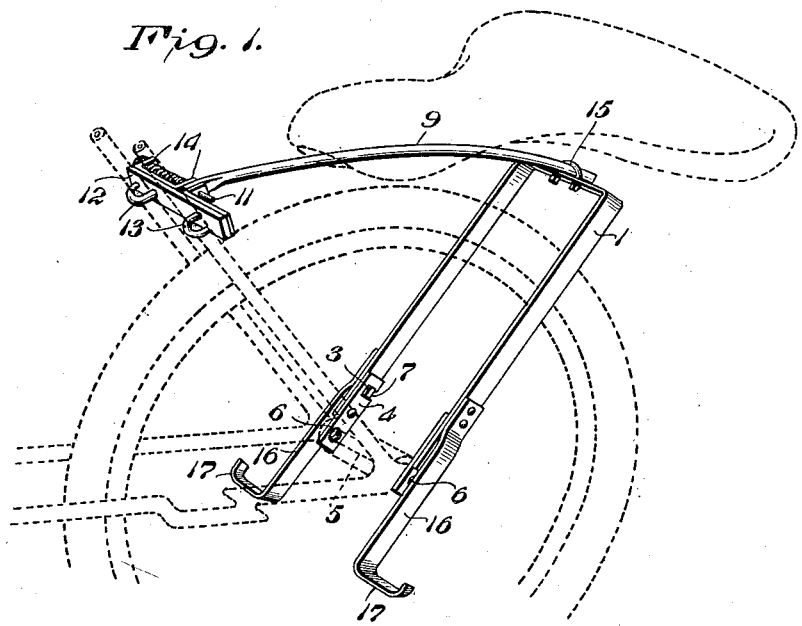
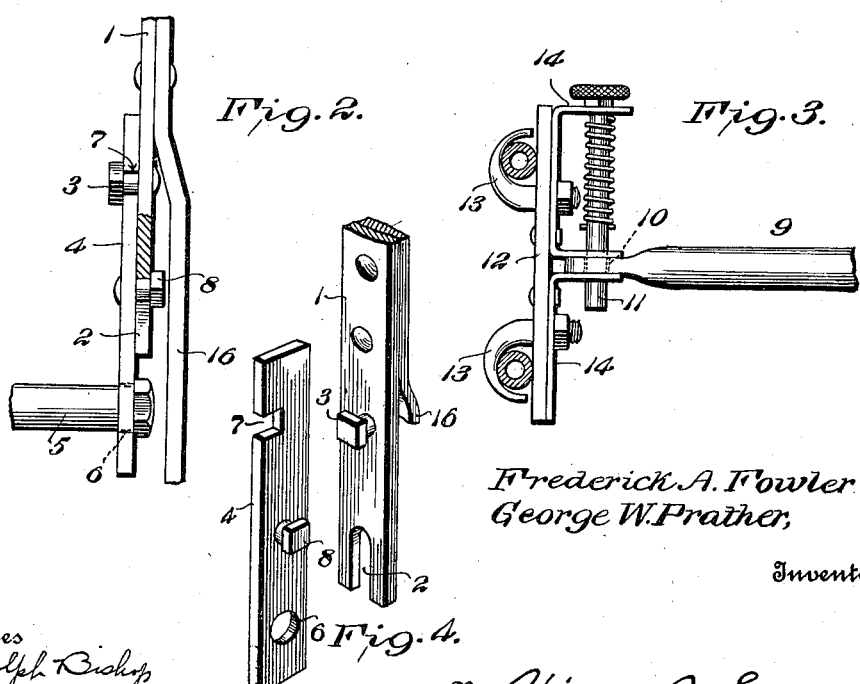
Frederick A. Fowler
George W. Prather,
Inventors
Witnesses
J. Adolph Bishop
V. B. Hillyard,
By Victor J. Evans
Attorney

UNITED STATES PATENT OFFICE.

FREDERICK A. FOWLER AND GEORGE W. PRATHER, OF LATON, CALIFORNIA.

SUPPLEMENTAL SEAT FOR MOTOR-CYCLES.

1,013,007.  Specification of Letters Patent.  Patented Dec. 26, 1911.

Application filed May 31, 1911. Serial No. 630,342.

*To all whom it may concern:*

Be it known that we, FREDERICK A. FOWLER and GEORGE W. PRATHER, citizens of the United States, residing at Laton, in the county of Fresno and State of California, have invented new and useful Improvements in Supplemental Seats for Motor-Cycles, of which the following is a specification.

The present invention provides an attachment which may be quickly fitted to the frame of a motorcycle or analogous machine and capable of being instantly removed therefrom, said attachment forming supporting means for a seat or luggage carrier.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a perspective view of an attachment embodying the invention, the dotted lines showing part of the motorcycle frame to which the attachment is fitted and a seat in place thereon. Fig. 2 is a detail view in elevation of the means whereby the attachment is connected to the frame of the motorcycle. Fig. 3 is a detail view, showing the means for connecting the stay rod of the attachment to the frame of the machine. Fig. 4 is a detail perspective view of one of the plates and a member of the frame attachment, showing the means of connection between them.

Corresponding and like parts are referred to in the following description, and indicated in all the views of the drawing, by the same reference characters.

The attachment comprises a frame 1 of substantially U-form which is adapted to embrace the upper portion of the rear wheel of a motorcycle or like machine. An open slot 2 is formed in the end of each leg or member of the frame and a headed stud 3 projects inwardly from each member a short distance from the slot. The parts 2 and 3 constitute means whereby the frame is adapted to be connected to plates 4 secured to the ends of the axle 5 of the rear wheel of the machine. Each of the plates 4 has an opening 6 near one end, a lateral slot 7 near the opposite end and a headed stud 8 intermediate of its ends, the headed stud 8 facing outwardly and adapted to enter the open slot 2. The lateral slot 7 of the plate receives the inwardly projecting stud 3 of a member of the frame 1. The plates 4 are secured upon end portions of the axle 5 which pass through the opening 6, said plates being retained upon the axle in any manner. When placing the frame 1 in position it is moved to bring the slots 2 in position to slip over the headed studs 8 of the plates 4, after which the frame is turned to cause the headed studs 3 thereof to enter the lateral slots 7 of said plates. A stay rod 9 fixes the position of the frame 1 and is connected at one end to the frame of the motorcycle or like machine in any manner and has its opposite end portion secured to the upper end of the frame 1. The stay rod 9 is adapted to receive the seat, luggage carrier or like part designed to be supported by means of the attachment. The stay rod 9 is curved and one end has an eye 10 to receive a latch bolt 11 mounted upon a cross bar 12, which is adapted to be secured to the frame of the machine by hook bolts 13 or like fastenings. Brackets 14 are secured or otherwise provided upon the cross bar 12 and support the latch bolt. The end of the stay rod 9 having the eye 10 is flattened and the flattened portion is fitted between end portions of the brackets 14. The hook bolts 13 are adapted to be turned to various positions to admit of feeding the stay rod to different makes of machines. The rear end of the stay rod 9 may be secured to the closed end of the frame 1 in any manner, as by means of a clip 15.

A bar 16 is secured to the lower end of each leg or member of the frame 1 and its lower end is bent laterally, as indicated at 17, to form a step or foot rest. The bars 16 may be secured to the frame 1 in any substantial way and are spaced from the lower slotted ends of the legs or side members thereof to admit of the heads of the studs 8 coming between the bars 16 and the slotted ends of the side members of the frame 1.

The cross bar 12 and the short bars 4 are fitted to the frame of the machine and remain attached thereto at all times. When it is required to place the attachment in position the slotted ends 2 of the frame are slipped upon the headed studs 8 of the bars 4, after which the frame is turned to cause the headed studs 3 to enter the slots 7. This brings the end of the stay rod 9 in position for the latch bolt to slip through the eye 10, thereby securing the attachment to the frame. When it is required to remove the attachment the latch bolt 11 is moved to free the stay rod 9 which is disengaged from the cross bar 12, after which the frame 1 is turned to withdraw the headed studs 3 from the slot 7 when the attachment may be lifted from the machine. It will thus be observed that the attachment may be quickly placed in position or removed from the framework of the motorcycle or like machine.

From the foregoing description, taken in connection with the accompanying drawing, the advantages of the construction and of the method of operation will be readily apparent to those skilled in the art to which the invention appertains, and while we have described the principle of operation of the invention, together with the device which we now consider to be the embodiment thereof, we desire to have it understood that the device shown is merely illustrative, and that such changes may be made when desired as are within the scope of the claims appended hereto.

Having thus described the invention what is claimed as new, is:—

1. An attachment for motorcycles and like machines, the same comprising a frame of substantially U form having open slots in the ends of its side members and having headed studs projecting laterally from the members and located a short distance from said slots, a stay rod attached to the closed end of said frame, means for connecting said stay rod to the frame of the machine, and bars fitted to the machine frame and having headed studs and slots, the studs receiving the slotted ends of the U-shaped frame and the slots adapted to receive the headed studs of the frame of the attachment.

2. An attachment for motorcycles and like machines, the same comprising a frame of substantially U-form having slots in the ends of its side members and having said members provided with laterally extending headed studs, bars provided upon the machine frame and having headed studs and slots to coöperate with the slots and headed studs of the U-shaped frame, a stay rod, means for adjustably connecting the stay rod to the U-shaped frame, a bar attached to the machine frame, and means for detachably connecting the stay rod to the said bar.

3. An attachment for motorcycles and like machines, the same comprising a frame of substantially U-form having slots in the end portions of its side members, laterally extending studs located upon the side members a short distance from the slotted ends thereof, bars provided upon the machine frame and having slots and laterally extending studs to coöperate with the studs and slots of the U-shaped frame, a stay rod, means for adjustably connecting the stay rod to the closed end of the U-shaped frame, means for detachably connecting the stay rod to the frame of the machine, and bars secured to the side members of the U-shaped frame and having laterally extending portions forming steps or rests, the slotted ends of the side members of the U-shaped frame being spaced from the bars forming the steps.

In testimony whereof we affix our signatures in presence of two witnesses.

FREDERICK A. FOWLER.
GEORGE W. PRATHER.

Witnesses:
J. W. HERBERT,
H. D. ANDERSON.